US012623188B2

(12) United States Patent　　(10) Patent No.:　US 12,623,188 B2

Nocera et al.　　(45) Date of Patent:　May 12, 2026

(54) FORWARD OSMOSIS DRIVEN BY ELECTROLYSIS

(71) Applicant: President and Fellows of Harvard College, Cambridge, MA (US)

(72) Inventors: Daniel G. Nocera, Cambridge, MA (US); Samuel S. Veroneau, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 615 days.

(21) Appl. No.: 17/926,103

(22) PCT Filed: May 19, 2021

(86) PCT No.: PCT/US2021/033055
　　§ 371 (c)(1),
　　(2) Date: Nov. 17, 2022

(87) PCT Pub. No.: WO2021/236705
　　PCT Pub. Date: Nov. 25, 2021

(65) Prior Publication Data
　　US 2023/0191328 A1　　Jun. 22, 2023

Related U.S. Application Data

(60) Provisional application No. 63/057,642, filed on Jul. 28, 2020, provisional application No. 63/027,733, filed on May 20, 2020.

(51) Int. Cl.
　　*B01D 61/00*　　(2006.01)
　　*C02F 1/44*　　(2023.01)
　　　　(Continued)

(52) U.S. Cl.
　　CPC ....... *B01D 61/005* (2013.01); *B01D 61/0022* (2022.08); *C02F 1/445* (2013.01);
　　　　(Continued)

(58) Field of Classification Search
　　CPC ............. B01D 61/005; B01D 61/0022; B01D 2313/345; B01D 2311/04;
　　　　(Continued)

(56) References Cited

U.S. PATENT DOCUMENTS 4,284,492 A　　8/1981　Karn
4,592,817 A　　6/1986　Chlanda et al.
　　　　(Continued)

FOREIGN PATENT DOCUMENTS

WO　　WO-2008115662 A2 *　9/2008　............... C25B 1/16
WO　　WO 2012/161663 A1　11/2012
WO　　WO 2020/058218 A1　3/2020

OTHER PUBLICATIONS

Zhang et al., Environ. Sci. Technol. 2013, 47, 10548-10555. (Year: 2013).*

(Continued)

*Primary Examiner* — Pranav N Patel
(74) *Attorney, Agent, or Firm* — Wolf, Greenfield & Sacks, P.C.

(57)　　　　ABSTRACT

Systems and methods for removing a contaminant from a liquid are generally described. The liquid (e.g., water) containing the contaminant may be flowed across a semipermeable membrane (e.g., via forward osmosis) that is not permeable to the contaminant in order to remove the contaminant from the liquid. A concentration gradient across the semipermeable membrane may be provided and maintained by electrolysis of the liquid and can drive forward osmosis of the liquid through the semipermeable membrane.

20 Claims, 5 Drawing Sheets

(51) Int. Cl.

| | |
|---|---|
| *C02F 1/46* | (2023.01) |
| *C02F 1/461* | (2023.01) |
| *C02F 101/12* | (2006.01) |
| *C02F 103/08* | (2006.01) |

(52) U.S. Cl.

CPC ........ *C02F 1/4604* (2013.01); *C02F 1/46104* (2013.01); *B01D 2313/345* (2013.01); *C02F 2101/12* (2013.01); *C02F 2103/08* (2013.01)

(58) Field of Classification Search

CPC ........... B01D 2311/2684; B01D 61/002; C02F 1/445; C02F 1/4604; C02F 1/46104; C02F 2101/12; C02F 2103/08; C02F 2001/46138; C02F 2103/002; C02F 2103/007; C02F 2201/009; C02F 2201/46115; C02F 2201/46165; C02F 2201/4618; C02F 2303/10; C02F 1/461; Y02A 20/131; Y02A 20/212; Y02W 10/30; Y02W 10/37

See application file for complete search history.

(56) References Cited

U.S. PATENT DOCUMENTS

| | | | |
|---|---|---|---|
| 8,641,875 B2 | 2/2014 | McAllister et al. | |
| 10,604,852 B2 | 3/2020 | Cronin et al. | |
| 2010/0270158 A1* | 10/2010 | Logan ..................... | C02F 3/005 |
| | | | 204/632 |
| 2011/0048962 A1 | 3/2011 | Reece et al. | |
| 2012/0156577 A1 | 6/2012 | Bulovic et al. | |
| 2013/0017414 A1* | 1/2013 | He .......................... | C02F 3/005 |
| | | | 204/252 |
| 2017/0129796 A1 | 5/2017 | Iyer | |
| 2020/0147553 A1* | 5/2020 | James ..................... | C02F 1/441 |

OTHER PUBLICATIONS

International Search Report and Written Opinion mailed Aug. 16, 2021 for International Application No. PCT/US2021/033055.
International Preliminary Report on Patentability mailed Dec. 1, 2022 for International Application No. PCT/US2021/033055.
Akther et al., Recent advancements in forward osmosis desalination: a review. Chem. Eng. May 25, 2015;281:502-522.
Al Mayyahi et al., Important Approaches to Enhance Reverse Osmosis (RO) Thin Film Composite (TFC) Membranes Performance. Membranes (Basel). Aug. 21, 2018;8(3):68. doi: 10.3390/membranes8030068.
Chekli et al., A comprehensive review of hybrid forward osmosis systems: Performance, applications and future prospects. J. Membr. Sci. Jan. 1, 2016;497:430-449.
Kesting et al., Semipermeable membranes of cellulose acetate for desalination in the process of reverse osmosis. II. Parameters affecting membrane gel structure. J. Appl. Polym. May 1965;9(5);1873-1893.
Koros et al., Terminology for membranes and membrane processes (IUPAC Recommendations). Pure Appl. Chem. 1996;68(7):1479-1489.
Lutchmiah et al., Verliefde AR, Roest K, Rietveld LC, Cornelissen ER. Forward osmosis for application in wastewater treatment: a review. Water Res. Jul. 1, 2014;58:179-97. doi: 10.1016/j.watres.2014.03.045. Epub Apr. 4, 2014. PMID: 24762551.
Son et al., Electro-Forward Osmosis. Environ Sci Technol. Jul. 16, 2019;53(14):8352-8361. doi: 10.1021/acs.est.9b01481. Epub Jul. 3, 2019.
Yip et al., High Performance Thin-Film Composite Forward Osmosis Membrane. Environ. Sci. Technol. Jan. 24, 2010;44(10):3812-3819.
Zheng et al., A low-cost and high-performance thin-film composite forward osmosis membrane based on an SPSU/PVC substrate. Sci. Rep. 2018;8:10022.
Extended European Search Report mailed Apr. 30, 2024 for Application No. EP 21808719.5.

* cited by examiner

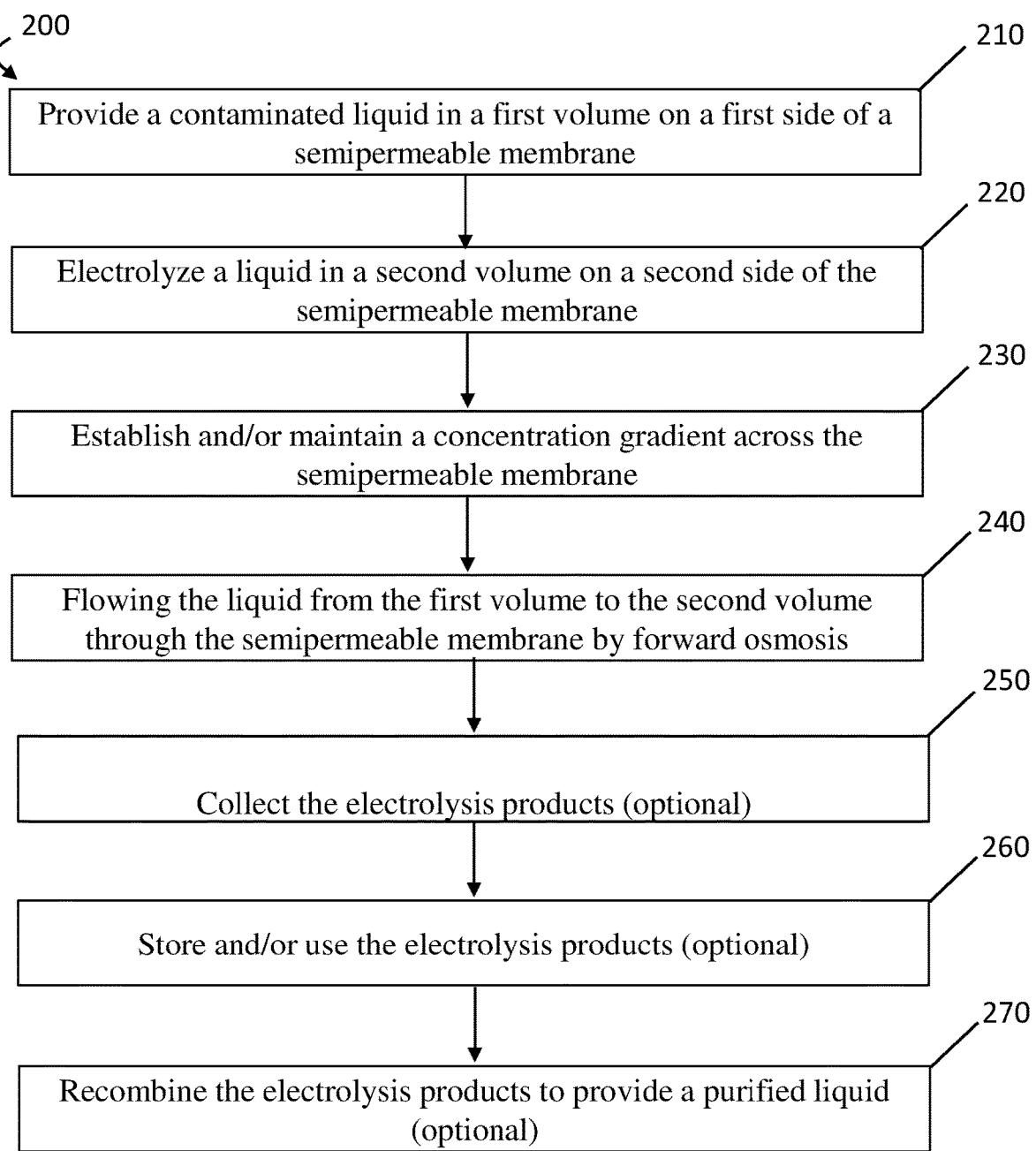

200

210
Provide a contaminated liquid in a first volume on a first side of a semipermeable membrane 220
Electrolyze a liquid in a second volume on a second side of the semipermeable membrane 230
Establish and/or maintain a concentration gradient across the semipermeable membrane 240
Flowing the liquid from the first volume to the second volume through the semipermeable membrane by forward osmosis 250
Collect the electrolysis products (optional)

260
Store and/or use the electrolysis products (optional)

270
Recombine the electrolysis products to provide a purified liquid (optional)

*FIG. 2*

FORWARD OSMOSIS DRIVEN BY ELECTROLYSIS

RELATED APPLICATIONS

This application is a national stage filing under 35 U.S.C. § 371 of international PCT application PCT/US2021/033055, filed May 19, 2021 which claims priority under 35 U.S.C. § 119(e) to U.S. Provisional Application No. 63/057,642, filed Jul. 28, 2020, and to U.S. Provisional Application No. 63/027,733, filed May 20, 2020, each of which is incorporated herein by reference in its entirety for all purposes.

GOVERNMENT SPONSORSHIP

This invention was made with government support under N00014-19-1-2385 awarded by the Office of Naval Research. The government has certain rights in the invention.

TECHNICAL FIELD

Systems and methods for removing a contaminant from a liquid are generally described.

BACKGROUND

Purifying water for use in chemical processes at scale persists as a challenge, particularly for energy storage. For example, the desalination of saltwater (e.g., seawater) could provide an abundant amount of molecularly pure water for water-splitting systems. Water desalination often involves reverse osmosis by forcing saltwater across a semipermeable membrane that is not permeable to salt or other contaminants; however, such water desalination is energy-intensive and may rely upon expensive reverse osmosis plants when performing at scale and may also detract from eventual aims of energy storage.

SUMMARY

Systems and methods for removing a contaminant from a liquid are generally described. The liquid (e.g., water) containing the contaminant may flow through a semipermeable membrane (e.g., via forward osmosis) that is not permeable to the contaminant in order to remove the contaminant from the liquid. A concentration gradient across the semipermeable membrane can be provided and maintained by electrolysis of the liquid and can drive forward osmosis of the liquid through the semipermeable membrane. The subject matter of the present disclosure involves, in some cases, interrelated products, alternative solutions to a particular problem, and/or a plurality of different uses of one or more systems and/or articles as disclosed herein.

In one aspect, a system is described comprising a first volume configured to contain a liquid including at least one contaminant, a second volume configured to contain the liquid and an electrolyte, a first electrode disposed at least partially in the second volume, a second electrode disposed at least partially in the second volume, and a semipermeable membrane disposed between the first volume and the second volume, wherein the semipermeable membrane is permeable to the liquid, wherein the semipermeable membrane is configured to exclude the at least one contaminant from the second volume, and wherein the semipermeable membrane is configured to exclude the electrolyte from the first volume.

In another aspect, a system is described comprising a first volume configured to contain a liquid including at least one contaminant, a second volume configured to contain the liquid and an electrolyte, a first electrode disposed at least partially in the second volume, a second electrode disposed at least partially in the second volume, and a semipermeable membrane disposed between the first volume and the second volume, wherein the first and second electrodes are configured to electrolyze the liquid to provide a concentration differential across the semipermeable membrane to induce a flow of the liquid from the first volume to the second volume.

In yet another aspect, a method is described comprising electrolyzing a liquid in a second volume containing an electrolyte to provide a concentration differential of the electrolyte in the second volume relative to a first volume containing the liquid and flowing the liquid from the first volume to the second volume through a semipermeable membrane.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 2 is a flowchart of a method for removing a contaminant from a liquid, according to some embodiments;

DETAILED DESCRIPTION

Figure 1:
FIG. 1 is a schematic diagram of a system for removing a contaminant from a liquid, according to some embodiments.

As noted above, desalination and other purification processes are typically energy intensive processes associated with a significant carbon footprint. Accordingly, the Inventors have recognized a need for improved systems and methods for liquid purification.

In view of the above, the Inventors have recognized the benefits associated with systems and methods for removing at least one contaminant from a liquid using forward osmosis through at least one semipermeable membrane. The at least one semipermeable membrane is permeable to the liquid but not the contaminant(s) such that forward osmosis may drive the liquid through the semipermeable membrane to filter the liquid and thereby remove the contaminant. However, in order to drive the liquid through the semipermeable membrane, a concentration gradient may be created or maintained across the semipermeable membrane between a first volume including the contaminated liquid and a second volume including the purified liquid where the first and second volumes are separated by the semipermeable membrane. In some embodiments, electrolysis of the liquid contained in the second volume may be used to establish and/or maintain a desired concentration gradient across the semipermeable membrane. Further, in some embodiments, the second volume may contain an electrolyte unable to pass through the semipermeable membrane, and the noted concentration gradient used to drive forward osmosis of the liquid across the semipermeable membrane may be a concentration gradient of the electrolyte across the semipermeable membrane.

For the purposes of this application, electrolysis describes the process of providing electrical current to drive a non-spontaneous chemical process. For example, electrolysis can be used to convert water into its elemental constituents, hydrogen (e.g., hydrogen gas) and oxygen (e.g., oxygen gas). Such a process is referred to as "water splitting." However, electrolysis can be performed on a variety of chemical species (e.g., a liquid) to generate a product (e.g., a gas product) to drive a forward osmosis process as described herein. Other appropriate liquids that may be used in addition to water may include, but are not limited to, alcohols (e.g., ethanol), and ammonia. Additional details regarding electrolysis are described elsewhere herein.

In some embodiments, electrolysis can be driven by a renewable energy source, such as solar power, hydroelectric power, and/or wind power. However, embodiments in which non-renewable energy sources are used are also contemplated. In some embodiments, the electrolysis products of the liquid (e.g., water) can be separated, collected, and/or stored. Accordingly, in some embodiments forward osmosis of the liquid across the semipermeable membrane may be combined with the production and capture of electrolysis products. This advantageously provides for the purification of the liquid while producing electrolysis products in tandem. The electrolysis products may be used for any appropriate application including the production of additional energy. For example, the electrolysis products may be fed into a fuel cell, a combustor, and/or any other appropriate system capable of generating power. Additionally, in some embodiments, the electrolysis products can be reacted to produce purified liquid (i.e., liquid free of the contaminant(s), liquid free of an electrolyte).

In some embodiments, the liquid comprises water, and systems and methods can be used to remove a contaminant from the water. The system can be an integrated system to purify water driven by a renewable energy (e.g., solar light or wind) source or other appropriate energy source. In some embodiments, electrolysis comprises water splitting, i.e., producing $H_2$ and $O_2$ by electrolyzing $H_2O$. A water source (e.g., a natural water source, seawater, river water, waste water, grey water) in a first volume can be separated from a second volume (e.g., an electrochemical cell) by a semipermeable membrane. Water within the second volume can then be "split" to produce hydrogen and oxygen in the second volume, which may contain an electrolyte and water with a reduced concentration of one or more contaminants relative to the first volume. The semipermeable membrane may be configured to permit the passage of water while blocking the passage of both the contaminant(s) and the electrolyte. Thus, water splitting decreases the concentration of water in the second volume relative to the first volume, which causes the concentration of electrolyte to increase in the second volume relative to the first volume. the resulting concentration gradient may produce an osmotic pressure that drives a flow of water from the first volume to the second volume through the semipermeable membrane. In some embodiments, the hydrogen and oxygen produced from water splitting may be collected, stored, and/or used. For example, the hydrogen and oxygen may be provided to a fuel cell to produce electricity with a byproduct of pure water. Thus, in some embodiments, the hydrogen and oxygen produced by water splitting may be combined to produce water that is essentially free of the contaminant(s) and the electrolyte (i.e., pure water). Additionally or alternatively, in some embodiments, the hydrogen and oxygen can be combined catalytically and/or to produce heat for other desired energy applications as noted above.

As described above, systems and methods for removing a contaminant for a liquid can include a semipermeable membrane. As understood by those skilled in the art, a semipermeable membrane is a membrane or a barrier that allows the passage of at least one chemical species (e.g., a liquid, water) while excluding the passage of one or more other chemical species (e.g., ions, molecules, and/or particulates). The semipermeable membrane can be selected and configured to permit passage of a desired chemical species while excluding other chemical species, and those of ordinary skill in the art based on the teachings of this disclosure will be capable of selecting an appropriate semipermeable membrane. Accordingly, the semipermeable can be characterized by a rejection rate of a certain species (e.g., a rejection rate of NaCl). Appropriate types of semipermeable membranes may include, but are not limited to, polymer cellulose triacetate, other various polymers, thin film composites (e.g., comprising polyamide, polyethersulfone, polysulfones, and/or zeolites), aquaporins (i.e., aquaporin proteins), chiral membranes, combinations of the forgoing, and/or any other appropriate semipermeable membrane.

The semipermeable membrane can be positioned to allow flow of a liquid from a first volume to a second volume through the semipermeable membrane. In some embodiments, the semipermeable membrane is disposed between the first volume and the second volume. As noted above, in some embodiments, the membrane is permeable to the liquid. Other interfaces between the first volume and the second volume, such as dividing walls or other barriers, may be impermeable to the liquid except through the semipermeable membrane. Accordingly, in some embodiments, the first volume and the second volume are in fluidic communication through the semipermeable membrane.

In some embodiments, the semipermeable membrane is configured to exclude at least one contaminant. The liquid can comprise the at least one contaminant (e.g., a contaminant dissolved or suspended within the liquid) and when the liquid flows across the semipermeable membrane, the liquid can pass through the semipermeable membrane while the contaminant is excluded. The second volume can contain an electrolyte (e.g., an electrolyte dissolved in or otherwise mixed with the liquid in the second volume). Accordingly, in some embodiments, the semipermeable membrane is configured to exclude an electrolyte contained within the second volume from the first volume.

In some embodiments, more than one semipermeable membrane can be included between the first volume and the second volume. In some embodiments, a semipermeable membrane or a combination of membranes can be employed. In such an embodiment, each membrane can be configured to exclude one or more chemical species (e.g., ions and/or particulates) to advantageously enhance the rejection rate of a set of chemical species while still permitting a liquid (e.g., water) to flow through the combination of membranes. For example, systems and methods may include two (or more) semipermeable membranes adjacent to one another, where the first semipermeable membrane is configured to reject NaCl, while the second semipermeable membrane is configured to reject KBr, but both can still permit the flow of a liquid that solubilizes NaCl and KBr (e.g., water). In this way, both NaCl and KBr can be excluded from a volume (e.g., the second volume). Systems and methods that include more than one semipermeable membrane adjacent to each other may be particularly advantageous for removing (e.g., purifying) more than one contaminant (e.g., NaCl, KBr, particulates) from a liquid.

A concentration gradient can be provided (e.g., maintained) across the semipermeable membrane. Because the semipermeable can prevent the passage of electrolyte and contaminant (or other chemical species), when the liquid in the second volume is decomposed into electrolysis products, the concentration of the electrolyte in the second volume is increased and the concentration of the liquid is decreased. The semipermeable membrane can be configured such that the electrolyte cannot pass from the second volume to the first volume creating a concentration gradient of the electrolyte across the semipermeable membrane. This induces a flow of the liquid from the first volume to the second volume due to the creation of an osmotic pressure. In certain embodiments, the contaminant within the liquid can be electrolyzed to provide the concentration gradient. The concentration gradient across the semipermeable membrane can be calculated by determining the difference in the concentration of a chemical species (e.g., the electrolyte and/or the contaminant(s)) in the first volume and the second volume. In some embodiments, the concentration gradient is greater than or equal to 6 mM, greater than or equal to 8 mM, greater than or equal to 10 mM, greater than or equal to 20 mM, greater than or equal to 25 mM, greater than or equal to 50 mM, greater than or equal to 100 mM, greater than or equal to 250 mM, greater than or equal to 500 mM, or greater than or equal to 1 M. In some embodiments, the concentration gradient is less than or equal to 1 M, less than or equal to 500 mM, less than or equal to 250 mM, less than or equal to 100 mM, less than or equal to 50 mM, less than or equal to 25 mM, less than or equal to 20 mM, less than or equal to 10 mM, less than or equal to 8 mM, or less than or equal to 6 mM. Combinations of the above-referenced ranges are also possible (e.g., greater than or equal to 6 mM and less than or equal to 100 mM). Other ranges are possible.

In some embodiments, flowing of the liquid comprises forward osmosis (e.g., across the semipermeable membrane). As is understood by those skilled in the art, forward osmosis refers to the spontaneous flow of a liquid (e.g., a solvent, water, etc.) from a lower concentration of solute to higher concentration of solute. In some embodiments, the solute comprises an electrolyte. The concentration gradient across the semipermeable membrane results in osmotic pressure across the membrane, which can result in flow of the liquid across the semipermeable membrane from the first volume into the second volume. In some embodiments, the concentration gradient (e.g., of the electrolyte) is maintained by electrolyzing the liquid in the second volume containing the electrolyte.

An osmotic pressure can be applied to a liquid across a semipermeable membrane to provide a driving force for forward osmosis across the semipermeable membrane. In some embodiments, the semipermeable membrane is under an osmotic pressure of greater than or equal to 10 bar, greater than or equal to 20 bar, greater than or equal to 30 bar, greater than or equal to 40 bar, greater than or equal to 50 bar, greater than or equal to 60 bar, greater than or equal to 70 bar, greater than or equal to 80 bar, greater than or equal to 90 bar, greater than or equal to 100 bar, greater than or equal to 150 bar, greater than or equal to 200 bar, greater than or equal to 300 bar, greater than or equal to 400 bar, or greater than or equal to 500 bar. In some embodiments, the semipermeable membrane is under an osmotic pressure of less than or equal to 500 bar, less than or equal to 400 bar, less than or equal to 300 bar, less than or equal to 200 bar, less than or equal to 150 bar, less than or equal to 100 bar, less than or equal to 90 bar, less than or equal to 80 bar, less than or equal to 70 bar, less than or equal to 60 bar, less than or equal to 50 bar, less than or equal to 40 bar, less than or equal to 30 bar, less than or equal to 20 bar, or less than or equal to 10 bar. Combinations of the above-referenced ranges are also possible (e.g., greater than or equal to 40 bar and less than or equal to 80 bar). Other ranges are possible. Providing such an osmotic pressure can increase the rate of contaminant removal. The osmotic pressure can be measured using several techniques known to those skilled in the art, including quantitatively using $\pi = icRT$ (where $\pi$=the osmotic pressure, i=the van't Hoff factor, c=molar concentration, R=the ideal gas constant, and T=temperature in Kelvins) or experimentally using a Pfeffer cell.

In some embodiments the liquid being purified may be water. Without wishing to be bound by theory, increasing rates of electrolysis that may be associated with higher current densities may result in decreasing the concentrations of $H^+$ ions ($H_3O^+$) in solution, which may result in an increased pH of the solution during operation. Thus, in some embodiments, a pH of a solution of a liquid and electrolyte contained within a volume undergoing electrolysis may be between or equal to 4 and 7. Accordingly, a semipermeable membrane may be selected to maintain its integrity and functionality within the expected operational range of pH values for a given system. Additionally, in some embodiments, the liquid contains a buffer that can maintain the pH of the water in a particular range.

The liquid (e.g., water) can include an electrolyte. In some embodiments, the liquid of the second volume comprises the electrolyte. The electrolyte can be a compound (e.g., a salt) dissolved in the liquid. In some embodiments, the electrolyte comprises potassium phosphate and/or methyl phosphonate. However, other electrolytes are possible so long as they can provide a concentration gradient to drive forward osmosis for the liquid. Non-limiting examples of other suitable electrolytes include potassium dihydrogen phosphate ($KH_2PO_4$), potassium hydrogen phosphate ($K_2HPO_4$), boric acid ($H_3BO_3$), potassium dihydrogen borate ($KH_2BO_3$), and/or potassium hydroxide (i.e., KOH). Additional non-limiting examples of suitable electrolytes include sodium dihydrogen phosphate ($NaH_2PO_4$), sodium hydrogen phosphate ($Na_2HPO_4$), boric acid ($H_3BO_3$), sodium dihydrogen borate ($NaH_2BO_3$), and/or sodium hydroxide (i.e., NaOH). While some embodiments may include an electrolyte, it will be understood that, in other embodiments, an uncharged species (e.g., a non-electrolyte, a molecular compound, glucose) may be dissolved in the liquid in order to provide the concentration that drives forward osmosis.

A system may exhibit any appropriate concentration of an electrolyte during electrolysis of the liquid to drive forward osmosis of a liquid across a semipermeable membrane. In some embodiments, a concentration of the electrolyte within a volume undergoing electrolysis is greater than or equal to 600 mM, greater than or equal to 700 mM, greater than or equal to 800 mM, greater than or equal to 900 mM, greater than or equal to 1 M or higher. In some embodiments, a concentration of the electrolyte is less than or equal to 1 M, less than or equal to 900 mM, less than or equal to 800 mM, less than or equal to 700 mM, or less than or equal to 600 mM. Combinations of the above-reference ranges are also possible (e.g., greater than or equal to 600 mM and less than or equal to 1 M). Other ranges are possible.

As mentioned above, systems and methods described herein can include a liquid. In some embodiments, the liquid comprises water (e.g., molecular water). However, other liquids such as alcohols (e.g., ethanol), ammonia, and/or any other appropriate liquid capable of undergoing electrolysis to form electrolysis products (e.g., gaseous electrolysis products) may be used as the disclosure is not so limited. Depending on the particular embodiment, a liquid may either be miscible with, form a phase segregated solution with, dissolve, or be dissolved in an electrolyte. Additionally, a contaminant may be dissolved in, suspended in, or otherwise present within a liquid prior to purification. Accordingly, it should be understood that the current disclosure is not limited to the particular type of liquid, contaminant, and/or electrolyte used.

Prior to purification, a liquid can comprise at least one contaminant. The contaminant can be any chemical species (e.g., salts, ions, particulate matter) to be removed from the liquid by flowing the liquid across the semipermeable membrane, which is configured to reject the contaminant. In some embodiments, the contaminant is present in seawater, wastewater, graywater, or other sources of water and removing the contaminant can result in substantially pure water. Accordingly, contaminants to be removed may include, salts (e.g. NaCl, bromides), organic matter, inorganic particulates, excretory products (e.g., urea), and/or any other contaminant that is desired to be removed from a liquid.

In some embodiments, the contaminant comprises a liquid and the systems and methods described herein may remove the contaminant by flowing the liquid contaminant from the first volume to the second volume through the semipermeable membrane. For example, the liquid can be ethanol, the liquid contaminant can be water, and the membrane can be configured to exclude ethanol. In such an example, electrolysis of the water can provide a concentration gradient for forward osmosis of the water whereby water is removed from the ethanol, thus effectively purifying the ethanol of a water contaminant.

Systems and methods described herein can include a first electrode and a second electrode. In some embodiments, the first and second electrodes are disposed at least partially in a liquid contained within the second volume. The electrodes can be used to perform electrolysis on the liquid contained within the second volume. In some embodiments, the first electrode is a cathode and the second electrode is an anode. In some embodiments, the first electrode comprises palladium (e.g., palladium metal). However, the first electrode can comprise any suitable material that can perform electrolysis on the liquid, such as metals, inorganic materials, and/or composite materials. For example, in some embodiments, the first electrode comprises platinum (e.g., platinum metal, platinum nanoparticles), molybdenum disulfide (i.e., $MoS_2$), tungsten disulfide ($WS_2$), a cobalt alloy, nickel (e.g., Ni metal), a nickel alloy (e.g., Ni metal alloy), and/or any other appropriate material. In some embodiments, the second electrode comprises cobalt phosphate (i.e., $CoP_i$), iridium (e.g., iridium metal, iridium nanoparticles, doped iridium, iridium dopants), iridium oxide ($IrO_x$), ruthenium (e.g., ruthenium metal, ruthenium nanoparticles, doped ruthenium, ruthenium dopants), ruthenium oxide ($RuO_x$), nickel borate (i.e., $NiBO_3$, $NiB_i$), FeNiOOH, perovskites, stainless steel, and/or any other appropriate material. In some embodiments, the various electrodes may take any appropriate physical form including, for example, a solid electrode, a porous electrode, a mesh electrode, and/or any other appropriate form. Of course, electrode materials and/or forms of electrodes may be used in the various embodiments disclosed herein as the disclosure is not limited in this fashion.

In some embodiments, systems and methods can include a reference electrode. The reference electrode can be at least partially disposed in the second volume. A reference electrode can be used to provide a potential of a known value to the first and/or second electrode relative to the reference electrode. In some embodiments, the reference electrode comprises an Ag/AgCl reference electrode, which uses the redox reaction between Ag and AgCl to provide a reference voltage for the first electrode and the second electrode.

As described above, systems and methods described herein can include a first volume. In some embodiments, the first volume contains the liquid and/or the contaminant(s). In some embodiments, the first volume can at least partially contain the second volume. The first volume can be at least partially or fully enclosed in any suitable container for holding the liquid, such as a flask, a beaker, a tank, and the like. The container can be made of any suitable material, such as glass, metal, and/or plastic. It will be understood that while the first volume can be a closed volume, in some embodiments, the volume can also be open volume (e.g., a lake, a river) and/or the open volume of the first container can at least partially contain the second volume.

Systems and methods described herein can also include a second volume. In some embodiments, the second volume contains the liquid and an electrolyte. In some embodiments, the second volume can be at least partially disposed in the first volume. The second volume can be any suitable container for holding the liquid, the first electrode, and the second electrode such as a flask, a beaker, an electrochemical cell, a tank, and the like. The second volume can be made of any suitable material, such as glass, metal, or plastic. In some embodiments, the second volume includes a conduit (e.g., an inlet, an outlet) for providing an inflow or outflow of fluid. For example, in some embodiments, the conduit permits the removal and/or collection of electrolysis products (e.g., $H_2$, $O_2$)

In some embodiments, the second volume comprises a barrier or divider. The barrier can be used to separate the first electrode and the second electrode that are at least partially within the second volume. The barrier can also keep separate electrolysis products to advantageously prevent these products from reacting with one another within the second volume. Additionally, the barrier can also facilitate separating electrolysis products for subsequent collection and/or storage. The barrier can be made of any suitable material (e.g., glass, plastic) for separating the electrolysis products. In some embodiments, the barrier is impermeable to the liquid; however, it should be noted that the barrier, in some embodiments, is permeable to the liquid.

In some embodiments, it may be desirable to mix the contents within either the first and/or second volumes. Accordingly, a volume (e.g., a first volume, a second volume) can be configured to provide mixing to the volume or the contents contained by the volume. Any suitable technique of providing mixing can be used, such as stirring, mechanical agitation, sonication, and the like. For example, in some embodiments, a bubbler can be used to agitate the contents within the volume. A bubbler can provide gas bubbles to a volume in order to agitate the liquid and components within the liquid (e.g., electrolysis products). In some embodiments, the gas bubbles provided by the bubbler are of an inert gas, such as nitrogen gas or argon. Advantageously, mixing of the volume can prevent, for example, the creation of locally acidic environments within the volume, which could damage or degrade components of the volume (e.g., the container of a volume, a first electrode, a second electrode).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Referring now to FIG. 1, a system 100 for removing a contaminant from a liquid is schematically illustrated. As shown in FIG. 1A, a first volume 110 contains a liquid 112, with liquid 112 containing contaminants 114. A second volume 120 is in fluidic communication with the first volume 110 via a semipermeable membrane 140 disposed between the first and second volumes. Second volume 120 also contains liquid 112, which can dissolve an electrolyte 130 within second volume 120. A first electrode 122 and a second electrode 124 are partially disposed in the second volume 120 such that the electrodes are disposed in the liquid contained in the second volume. Additionally, in some embodiments, the electrodes, and a head space above the electrodes, may be separated by a barrier 125.

The semipermeable membrane 140 is configured to permit passage of liquid 112 between the first volume 110 and the second volume 120 while preventing passage of contaminants 114 and electrolyte 130 between the first and second volumes through the semipermeable membrane. Similarly, depending on the particular embodiment, the barrier 125 may either be: a solid impermeable barrier that only extends vertically between an upper portion of the second volume while leaving a bottom portion of the second volume without a barrier; a semipermeable membrane that prevents the passage of gas bubbles of the electrolysis products through the barrier while permitting the passage of ions and fluid between the electrodes; a solid ionically conductive material capable of passing ions through the barrier; combinations of the foregoing; and/or any other appropriate barrier.

System 100 may also include a first conduit 160 in fluid communication with the first volume which can be used to provide fluids such as the contaminated liquid (e.g., water, seawater, wastewater) to the first volume. The system may also include one or more second conduits 162 that are in fluid communication with a headspace disposed above a liquid contained in the second volume to remove fluids from, such as gas products from electrolysis of the liquid, for subsequent storage and/or use. For example, two separate conduits are shown that are in fluid communications with separated headspace volumes that contain oxygen and hydrogen respectively, or other appropriate electrolysis products. The separated oxygen and hydrogen may be flowed out from the head space where they are separately stored, combusted, and/or provided to the inlets of a fuel cell. However, embodiments in which electrolysis products are not separated from one another are also contemplated.

During operation, a power supply 170 may apply power (e.g., a voltage differential and/or current) to the first electrode 122 and second electrode 124 to perform electrolysis 150 on liquid 112 present in the second volume 120 to form distinct electrolysis products 152 and 154. In some embodiments, the power supply provides energy from a renewable energy source (e.g., solar power, wind power). In either case, the Barrier 125 may prevent the passage of the electrolysis products 152 and 154 through the barrier such that the electrolysis products are maintained in separate isolated portions of the second volume so that products can be subsequently collected, stored, and/or used. As mentioned above, in some embodiments, a one or more conduits (e.g., conduit 162) may be configured to remove the electrolysis products from the headspace of the second volume for collection, storage, and/or use. For example, in the depicted embodiment where a barrier 125 is disposed between the two upper portions of the second volume, the separate portions of the headspace may include separate gaseous electrolysis products such as oxygen and hydrogen that may be flowed out of the second volume through the separate conduits.

Without wishing to be bound by theory, electrolysis of the liquid 112 within the second volume removes a portion of the liquid contained within the second volume in the form of gas bubbles. If additional liquid is not provided to the second volume from the first volume, this removal of a portion of the liquid as electrolysis products may decrease a concentration of the liquid in the second volume and correspondingly increase a concentration of the electrolyte within the second volume. Thus, electrolysis of the liquid may be used to either create and/or maintain a concentration gradient of the electrolyte and liquid across the semipermeable membrane between the second volume and the first volume.

The concentration gradient across the semipermeable membrane between the first volume and the second volume can be used to drive forward osmosis. For example, as schematically illustrated in FIG. 1, the concentration gradient creates an osmotic pressure that results in the liquid 112 flowing across the semipermeable 140 due to forward osmosis 156 from the first volume 110 into second volume 120. Due to the semipermeable membrane 140 excluding the one or more contaminants 114, the liquid flowing into the second volume may exhibit a substantially reduced concentration of the contaminants, and in some instances substantially no contaminants, as compared to the unfiltered liquid in the first volume. Correspondingly, the semipermeable membrane may retain the electrolyte 130 within the second volume such that the amount (e.g., moles) of electrolyte within the second volume does not change in some embodiments. Thus, as liquid 120 flows across semipermeable membrane 140, the liquid is purified of contaminants 114.

In the depicted embodiment, as liquid 112 flows from the first volume 110 into the second volume 120, the amount of liquid in the first volume 110 may decrease depending on whether or not the first volume is a contained volume or an open volume. Accordingly, in some embodiments, more liquid (e.g., liquid comprising a contaminant) can be added to the first volume. For example, conduit 160 can act as an inlet for more contaminated liquid to be added to first volume 110 from a contaminated liquid source. Thus, the liquid purification and electrolysis process may be performed continually though embodiments in which the contaminated liquid is not replenished during operation are also contemplated (e.g., in an unenclosed first volume).

The systems and method described herein can provide several advantages. First, the electrolysis of a liquid (e.g., water splitting) can drive forward osmosis from a first volume to a second volume across a semipermeable membrane. In contrast, existing systems using forward osmosis typically use initial concentration gradients that eventually decay to equilibrium, or the continual addition of a compound to the system (e.g., an electrolyte, a salt or contaminant) to maintain a concentration gradient. In contrast, in systems and methods described herein, the concentration gradient is advantageously initially established and/or maintained (e.g., continuously maintained) by electrolysis of the liquid to provide the desired concentration gradient to drive forward osmosis to remove contaminants from the liquid and to produce electrolysis products (e.g., hydrogen gas, oxygen gas).

Having described the general structure of a system, a method of purifying a liquid 200 is described relative to FIG. 2. At 210 a contaminated liquid is provided in a first volume on a first side of a semipermeable membrane. The liquid may be any appropriate liquid and may include any appropriate contaminant as previously described. A purified liquid including an electrolyte may be present in a second volume on a second side of the semipermeable membrane. Electrolysis of the liquid present in the second volume may be performed at 220 to establish and/or maintain a desired concentration gradient of the liquid and/or electrolyte across the semipermeable membrane at 230. The concentration gradient may result in the liquid flowing from the first volume to the second volume through the semipermeable membrane by forward osmosis while preventing the passage of the electrolyte and contaminants between the volumes at 240. In some instances, and as mentioned previously above, it may be desirable to collect the separate electrolysis products at 250. The collected electrolysis products may then be stored and/or used in any appropriate fashion at 260. For example, the electrolysis products may be stored in compressed cylinders, used for chemical reactions, combusted, provided to the inlet of a fuel cell for power generation, and/or any other appropriate application. Additionally, in some instances it may be desirable to recombine the electrolysis products to provide a purified liquid at 270. For instance, oxygen and hydrogen may be provided to the inlets of a fuel cell which may use the hydrogen and oxygen to generate power prior to outputting purified water.

As another advantage, electrolysis utilized in the systems and methods described herein can be driven by renewable energy sources, such as solar power (e.g., solar panels) or wind power (e.g., wind turbines). As a result, systems and methods described herein can be carbon neutral while removing contaminants from a liquid. However, in some embodiments, system and methods can be powered by other power sources such as batteries, power plants, grids (e.g., smart grids), and the like.

As yet another advantage, electrolysis can be coupled with forward osmosis, and the electrolysis products can be subsequently collected, stored, and/or used. In some embodiments, the electrolysis products can be used to produce energy and/or reacted to form a product (e.g., pure water). By contrast, certain existing systems, for example, those that use reverse osmosis require the input of energy without creating energetic electrolysis products that can be subsequently collected, stored, or reacted.

The following examples are intended to illustrate certain embodiments of the present disclosure, but do not exemplify the full scope of the disclosure.

EXAMPLE 1

The following example describes the fabrication of a system for removing sodium chloride contaminants from water and physical parameters (e.g., osmotic pressure, concentration, current densities) of the system.

A cell was constructed for removing sodium chloride from water. The cell operated on the basis of forward osmosis, which is the converse of reverse osmosis. The principle of reverse osmosis is to apply an external pressure to overcome a concentration gradient. For example, seawater water can be forced through a semipermeable membrane with moderate pressure (e.g., 40-80 bar for seawater) to generate a stream of desalinated water. Conversely, the principle of forward osmosis is to provide a concentration gradient to generate pressure (e.g., osmotic pressure), which produces liquid (e.g., solvent, water) flow from a less concentrated solution into a more concentrated solution. For example, seawater can be separated from freshwater by a semipermeable membrane and can generate flow from the freshwater reservoir through the semipermeable membrane to the seawater reservoir.

Relevant to both forward and reverse osmosis are semipermeable membranes, which, can allow liquid to flow through the semipermeable membrane but can exclude ions. These membranes can be composed of various materials. One example of a semipermeable membrane is cellulose triacetate membrane.

The basis of forward osmosis is osmotic pressure, which directly correlates with differences in concentration and can be quantified per Equation 1 and flow can be further quantified a shown in Equation 2:

$$\pi = iRT\Delta C; \tag{1}$$

where $\pi$ is osmotic pressure, i is the van't Hoff index, R is the ideal gas constant, T is the temperature, and $\Delta C$ is the concentration gradient $$q_{in} \equiv H_2O \text{ Flow} = \frac{K_w S}{d}\pi; \tag{2}$$

where $K_w$ is the membrane coefficient, S is the membrane surface area, d is the membrane thickness, and $\pi$ is the osmotic pressure.

The equations above, describing osmotic pressure and flow derived from osmotic pressure, demonstrate that water flow is directed by a concentration gradient, assuming a specific semipermeable membrane (i.e., a particular but constant $K_w$, S, and d) and a constant temperature. While certain factors (e.g., hydraulic pressure, laminar flow) are not included in the above equations, the above such equations provide an adequate description of the system to understand the principles of operation. In certain existing forward osmosis-driven systems, an initial concentration gradient is slowly dissipated as water flows into the system, in turn lowering water flow. In such certain existing systems, if the system is static, an equilibrium is eventually reached, wherein no net water flow is observed because forward osmosis proceeds with a net water flow when there is a concentration gradient is continually maintained. Some existing forward osmosis systems overcome this by continually regenerating the concentration gradient with the addition of salt. As described in this example and elsewhere herein, the concentration gradient to drive forward osmosis can be maintained by water splitting to produce oxygen and hydrogen.

Water-splitting, and specifically electrochemical water-splitting, relies upon an applied potential (and current) to drive the hydrogen evolution reaction (HER) and oxygen evolution reaction (OER). As current describes the number of electrons flowing through a system, current can also describe the rate with which water is removed from a water-splitting system per Equation 3:

$$q_{out} \equiv H_2O \ Flow = \frac{iV_m}{2F}; \tag{3}$$

where i here is the current, $V_m$ is the molar volume of water, and F is Faraday's constant.

The equation above shows water flow (out of a water-splitting system) is directed by the applied current. Considering water-splitting and forward osmosis, the former provides water flow out of a system and the latter provides water flow into a system. A continual supply of water is provided into a water-splitting cell (via forward osmosis) when these two rates of flow are equal and while a concentration gradient is maintained by a continual removal of water (e.g., via water-splitting.) This steady state can be approximated by setting Equations 2 and 3 equal to one another:

Define α as $$\frac{K_w S}{d} \ so \ q_{in} = \alpha\Delta P$$

such that α defines membrane constants

Define β as $$\frac{V_m}{2F}$$

so $q_{out} = \beta i$ such that β defines current constants

Define γ as irT so $\Delta P = \pi = \gamma\Delta C$ such that γ defines osmosis constants At steady state:$|q_{in}| = |q_{out}|$ thus $\beta i = \alpha\gamma\Delta C$ or $$i/\Delta C = \alpha\gamma/\beta \tag{4}$$

The values defined on the right side of Equation 4 are constants, and so current can be correlated directly with concentration gradients to approximate a steady state. At such a point, the rate of water flow into the cell (e.g., via forward osmosis) equals the water flow out of the cell (e.g., via water-splitting). Advantageously, when seawater is used as the source of this water, continual water-splitting directly from seawater is allowed without need for external intervention.

In this example, the concentration of seawater is approximately 600 mM, composed primarily of NaCl; therefore, a cell operating in an electrolyte with an ionic concentration greater than 600 mM can accommodate forward-osmosis-driven water-splitting. For OER catalysts, water-splitting cells rely upon buffer systems, typically ~100 mM. This electrolyte concentration can be increased without loss in activity. Furthermore, even higher concentration gradients can be achieved by driving water splitting from concentrated base.

An OER probe (Cell 1) was enclosed in an electrochemical system separated from its surrounding solution (Cell 2) by a cellulose triacetate semipermeable membrane. This chosen membrane operates at neutral or slight acidic conditions (e.g., a pH of 4-7) and, again, is a common semipermeable membrane. Two available buffers for neutral conditions are phosphate (e.g., potassium phosphate, KPi) and methyl-phosphonate (MePi) and were used in this example. The enclosed system (Cell 1) thus contained a MePi buffer solution and operated as a three-component electrochemical cell, with a CoPi anode, Pd-wire cathode, and Ag/AgCl reference electrode. Additionally, a bubbler was added to agitate the system and prevented any locally acidic environment from degrading the cell. The CoPi anode was deposited onto a 4 cm² FTO (fluorine-doped tin oxide) slide and operated at a potential of 1.3 V vs. NHE (normal hydrogen electrode) applied potential to accommodate an ~1 mA/cm² current.

A 4 cm² anode performing water splitting at ~1 mA/cm² is proportionate to ~6×10⁻³ mL per hour. To determine the concentration gradient needed to accommodate water-splitting at this potential, the membrane flow was first approximated. This was accomplished by placing an OER probe (Cell 1) filled with 1 M MePi in deionized water and measuring flow over the span of an hour. Per Equation 2, the rate of flow was proportionate the concentration gradient. As this concentration gradient changes with flow into the cell, instantaneous flow is described by a non-linear differential equation with no simply derived solution. An approximation was instead performed by assuming flow and concentration at time 30 minutes was equivalent to average flow over one hour. Relying on this assumption, the average rate of water flow from forward osmosis was calculated to be ~1 mL per molar per hour. Thus, running a concentration gradient of ~6 mM would theoretically be able to continually supply the influx of water for operating this OER probe (Cell 1). Substituting known and approximate values into Equation 4 the following relation is obtained:

$$i/\Delta C = \alpha\gamma/\beta = 1.32 \ mA/mM\cdot cm^2 \tag{5}$$

The above relation reveals that a relatively small change in concentration gradient (100 mM) can accommodate a relatively high operating current (100 mA). Moreover, this was accomplished with a 1 cm² membrane, and this area can be easily be scaled up or down to meet demands of specific systems.

Figure 3:
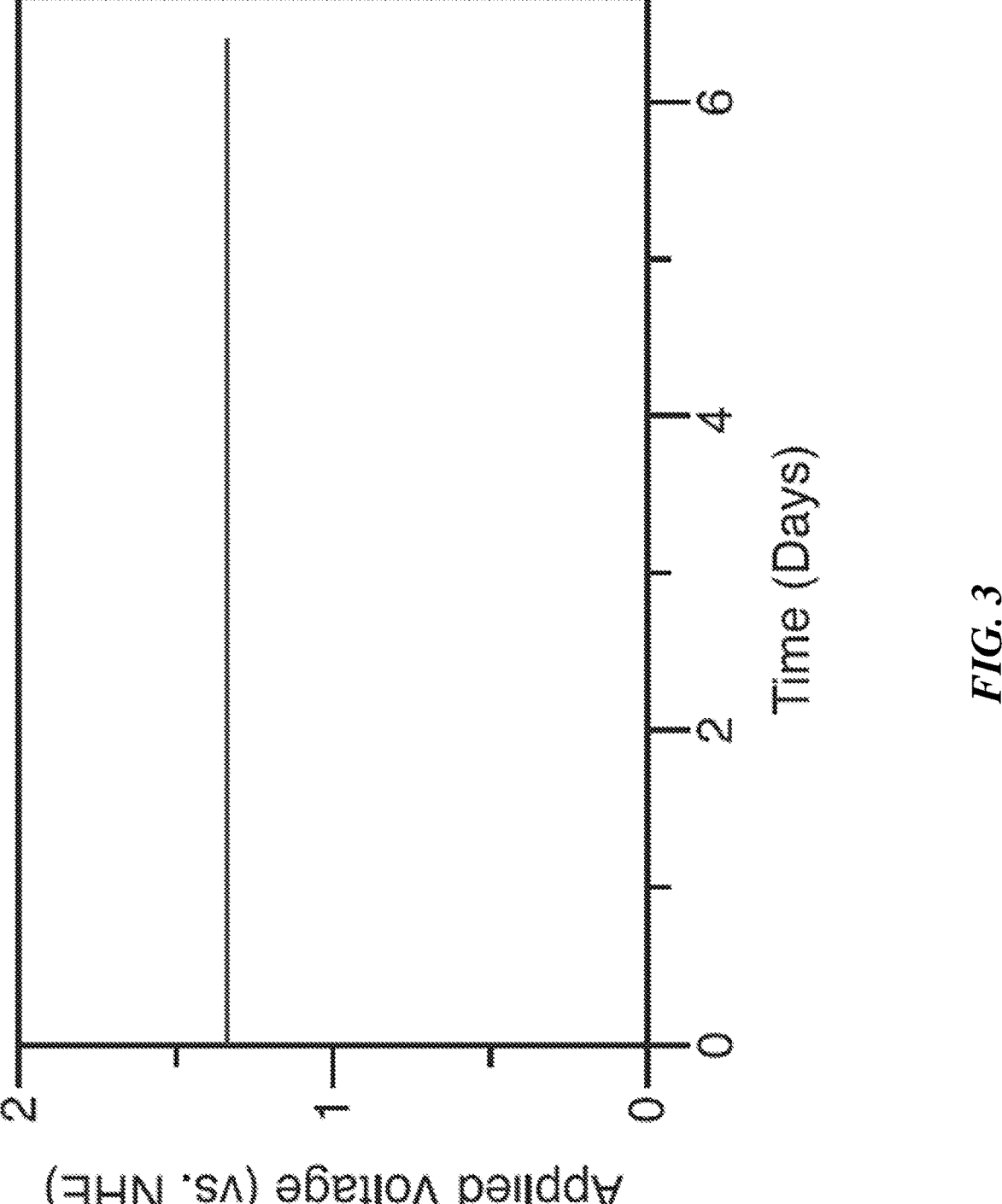
FIG. 3 is a plot of the applied voltage of electrolysis at a constant current as a function of time, according to one embodiment.

Under actual operating conditions, evaporation can also impact the amount of water in the cell and, moreover, a cellulose triacetate semipermeable membrane, in some cases, may not operate effectively with such a minute concentration gradient. To overcome these practical limitations, a buffer system containing 700 mM MePi was chosen, which was empirically shown to allow this cell to operate continually. This concentration was a deviation from equilibrium conditions; however, given competing flows in an out of the cell, an equilibrium could eventually be reached from either side so long as the OER probe could accommodate the change in volume for reaching a steady-state. To assess the viability of this OER probe (Cell1) and the forward osmosis approach, chronopotentiometry was employed to observe stability and activity (FIG. 3). A cell was constructed and a 600 mM NaCl solution was used as a seawater simulant. As evidenced from FIG. 3, no loss in activity was observed and, moreover, no decrease in volume was observed, consistent with the expectation of steady state operation. It is noted the slight fluctuations in operating potential apparent in FIG. 3 are anticipated with normal operation of employed electrodes, owing primarily to generation and transient adsorption of gaseous products to electrode surfaces.

EXAMPLE 2

The following example describes the fabrication of a system for removing sodium chloride contaminants from water and physical parameters (e.g., osmotic pressure, concentration, current densities) of the system identical to that of Example 1, except using a sodium phosphate butter in place of a potassium phosphate buffer.

In this example, the concentration of seawater is approximately 600 mM, composed primarily of NaCl; therefore, a cell operating in an electrolyte with an ionic concentration greater than 600 mM can accommodate forward-osmosis-driven water-splitting. For OER catalysts, water-splitting cells rely upon buffer systems, typically ~100 mM. This electrolyte concentration can be increased without loss in activity. Furthermore, even higher concentration gradients can be achieved by driving water splitting from concentrated base.

An OER probe (Cell 1) was enclosed in an electrochemical system separated from its surrounding solution (Cell 2) by a cellulose triacetate semipermeable membrane. This chosen membrane operates at neutral or slight acidic conditions (e.g., a pH of 4-7) and, again, is a common semipermeable membrane. Two available buffers for neutral conditions are phosphate (e.g., sodium phosphate, $NaP_i$) and methyl-phosphonate ($MeP_i$) and were used in this example. The enclosed system (Cell 1) thus contained a $NaP_i$ buffer solution and operated as a three-component electrochemical cell, with a Pt-wire anode, Pt-wire cathode, and Ag/AgCl reference electrode. Additionally, a bubbler was added to agitate the system and prevented any locally acidic environment from degrading the cell.

In this iteration, the anode performed water splitting at 250 mA which is proportionate to ~2.5 mL $H_2O$ per day being consumed via water-splitting. To determine the concentration gradient needed to accommodate water-splitting at this potential, the membrane flow was first approximated. This was accomplished by placing an OER probe (Cell 1) filled with 1 M $NaP_i$ in deionized water and measuring flow over the span of an hour. Per Equation 2, the rate of flow was proportionate the concentration gradient. As this concentration gradient changes with flow into the cell, instantaneous flow is described by a non-linear differential equation with no simply derived solution. An approximation was instead performed by assuming flow and concentration at time 30 minutes was equivalent to average flow over one hour. Relying on this assumption, the average rate of water flow from forward osmosis was calculated to be ~1 mL per molar per hour. Thus, running a concentration gradient of ~250 mM would theoretically be able to continually supply the influx of water for operating this OER probe (Cell 1). Substituting known and approximate values into Equation 4 the following relation is obtained:

$$i/\Delta C = \alpha\gamma/\beta = 1.05 \text{ mA/mM·cm}^2 \qquad (6)$$

The above relation reveals that a relatively small change in concentration gradient (100 mM) can accommodate a relatively high operating current (100 mA). Moreover, this was accomplished with a 1 $cm^2$ membrane, and this area can easily be scaled up or down to meet demands of specific systems.

An electrolyte of 800 mM $NaP_i$ was chosen to accommodate a current of 250 mA, which was empirically shown to allow this cell to operate continually. This concentration was a deviation from calculated equilibrium conditions; however, given competing flows in an out of the cell, an equilibrium could eventually be reached from either side so long as the OER probe could accommodate the change in volume for reaching a steady-state. To assess the viability of this OER probe (Cell 1) and the forward osmosis approach, chronopotentiometry was employed to observe stability and activity. A cell was constructed and a 600 mM NaCl solution was used as a seawater simulant. No loss in activity was observed and, moreover, no decrease in volume was observed, consistent with the expectation of steady state operation.

EXAMPLE 3

The following example describes the purification of unfiltered, untreated sea water using a nickel cathode and a stainless steel anode.

Figure 4:
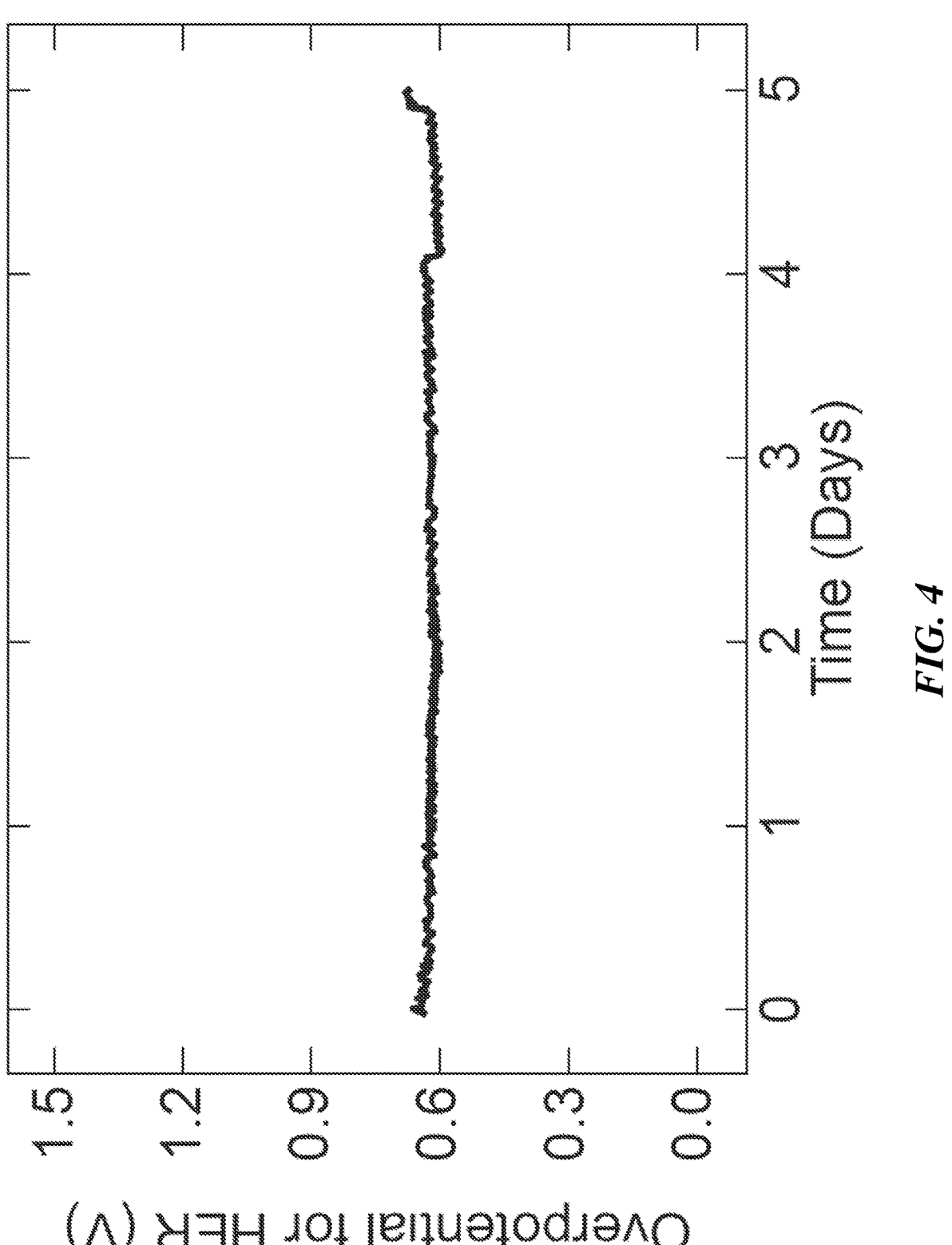
FIG. 4 is a plot of the overpotential of the HER reaction at a constant current as a function of time, according to one set of embodiments.
Figure 5:
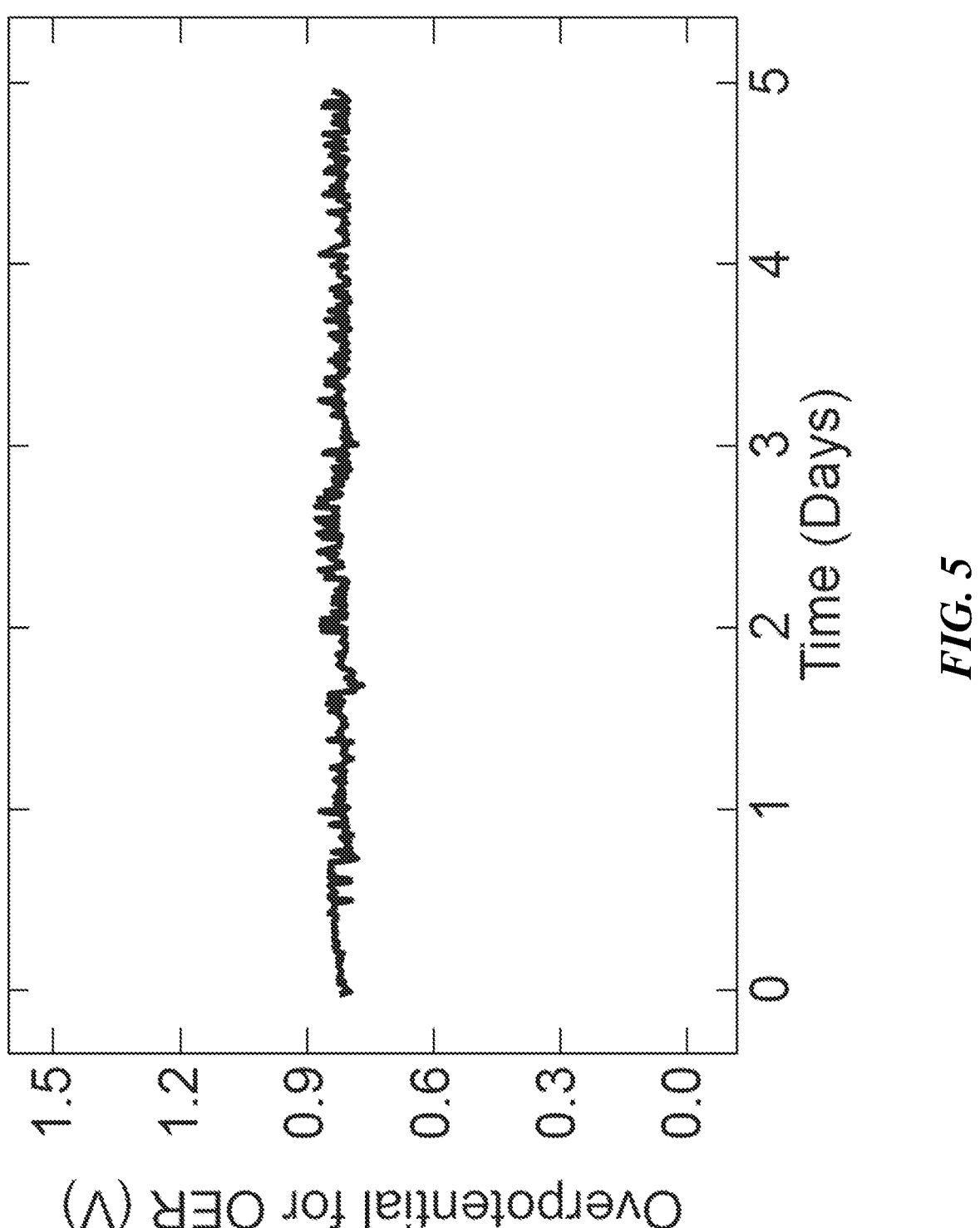
FIG. 5 is a plot of the overpotential of the OER reaction a constant current as a function of time, according to one set of embodiments.

Unfiltered/untreated seawater was collected from the Atlantic Ocean and used in this example. Seawater contains ions (e.g., Ca, Mg) and impurities (e.g., algae), which may not be present in laboratory solutions of NaCl. Non-precious metal electrodes were used to drive hydrogen evolution (HER) and oxygen evolution reactions (OER) at the cathode and anode respectively, specifically a Ni cathode and stainless steel mesh anode. These electrodes are orders-of-magnitude more abundant and affordable compared to Pt electrodes. Chloride oxidation and overpotentials were lowered with a phosphate-based electrolyte. Using these non-precious metal electrodes, the overpotentials for driving HER and OER were lowered to 0.62 V and 0.87 V, respectively, when applying 125 mA of current (FIG. 4). It is noted the slight fluctuations in operating potential apparent in FIGS. 4 and 5 are anticipated with normal operation of employed electrodes, owing primarily to generation and transient adsorption of gaseous products to electrode surfaces In these conditions, a Faradaic efficiency of 100% was preserved for both HER and OER over at least five days. While ion leaching and accumulation was observed, minimal chloride oxidation was found to be proceeding, suggesting that stainless steel may be more selective to OER over chloride oxidation when compared to Pt. In addition, when electrolysis is performed directly in unfiltered/untreated seawater without using upon forward osmosis, precipitation of insoluble Mg and Ca carbonate/hydroxide species was observed around the cathode. This precipitation can considerably increase the overpotential for HER. Further, when stainless steel is employed as the anode materials directly in unfiltered/untreated seawater without using upon forward osmosis, immediate corrosion and increase the overpotential for OER were observed. Both of these challenges could be avoided by coupling electrolysis with forward osmosis.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
   a first volume configured to contain a liquid including at least one contaminant;
   a second volume configured to contain the liquid and an electrolyte;
   a first electrode disposed at least partially in the second volume;
   a second electrode disposed at least partially in the second volume; and
   a semipermeable membrane disposed between the first volume and the second volume,
   wherein the semipermeable membrane is permeable to the liquid,
   wherein the semipermeable membrane is configured to exclude the at least one contaminant from the second volume, and
   wherein the semipermeable membrane is configured to exclude the electrolyte from the first volume.

2. A system, comprising:
   a first volume configured to contain a liquid including at least one contaminant;
   a second volume configured to contain the liquid and an electrolyte;
   a first electrode disposed at least partially in the second volume;
   a second electrode disposed at least partially in the second volume; and
   a semipermeable membrane disposed between the first volume and the second volume,
   wherein the first and second electrodes are configured to electrolyze the liquid to provide a concentration differential across the semipermeable membrane to induce a flow of the liquid from the first volume to the second volume.

3. The system of claim 1, further comprising a power source configured to apply a voltage differential to the first and second electrodes to electrolyze the liquid in the second volume.

4. The system of claim 1, further comprising the liquid disposed in the first volume and the second volume and the electrolyte disposed in the first volume.

5. The system of claim 1, further comprising a reference electrode disposed at least partially in the second volume.

6. The system of claim 1, further comprising at least one conduit in fluid communication with the second volume, wherein the at least one conduit is configured to remove at least one electrolysis product from a head space of the second volume.

7. The system of claim 1, wherein the semipermeable membrane is under an osmotic pressure of greater than or equal to 40 bar.

8. The system of claim 1, wherein the semipermeable membrane is under an osmotic pressure of less than or equal than 80 bar.

9. The system of claim 1, wherein the liquid comprises water.

10. The system of claim 1, wherein the semipermeable membrane is permeable to the liquid.

11. The system of claim 1, wherein the semipermeable membrane is configured to exclude the contaminant and/or the electrolyte.

12. The system of claim 1, wherein the semipermeable membrane is configured to exclude the at least one contaminant and/or electrolyte from the second volume.

13. The system of claim 1, wherein the electrolyte comprises potassium phosphate and/or methyl phosphonate.

14. The system of claim 1, wherein the contaminant comprises a salt and/or a molecular compound soluble in the liquid.

15. The system of claim 2, further comprising a power source configured to apply a voltage differential to the first and second electrodes to electrolyze the liquid in the second volume.

16. The system of claim 2, further comprising the liquid disposed in the first volume and the second volume and the electrolyte disposed in the first volume.

17. The system of claim 2, further comprising a reference electrode disposed at least partially in the second volume.

18. The system of claim 2, further comprising at least one conduit in fluid communication with the second volume, wherein the at least one conduit is configured to remove at least one electrolysis product from a head space of the second volume.

19. The system of claim 2, wherein the electrolyte comprises potassium phosphate and/or methyl phosphonate.

20. The system of claim 2, wherein the semipermeable membrane is configured to exclude at least one contaminant and/or electrolyte from the second volume.

* * * * *